US008169915B1

(12) United States Patent
Rangavajjhala et al.

(10) Patent No.: US 8,169,915 B1
(45) Date of Patent: May 1, 2012

(54) METHOD AND APPARATUS FOR NETWORK LOAD BALANCING USING INDIRECTION RAM DURING CLASSIFICATION

(75) Inventors: Venkata Rangavajjhala, Fremont, CA (US); Marc A. Schaub, Sunnyvale, CA (US)

(73) Assignee: Tellabs Operations, Inc., Naperville, IL (US)

( * ) Notice: Subject to any disclaimer, the term of this patent is extended or adjusted under 35 U.S.C. 154(b) by 329 days.

(21) Appl. No.: 12/239,118

(22) Filed: Sep. 26, 2008

(51) Int. Cl.
  *H04J 1/16* (2006.01)
(52) U.S. Cl. .............. 370/237; 370/378; 370/395.32
(58) Field of Classification Search .......... 370/229, 370/230, 231, 235, 351, 357, 360, 375, 378, 370/379, 389, 395.1, 395.7, 412, 428, 429, 370/392, 237, 395.3, 395.31, 395.32
See application file for complete search history.

(56) References Cited

U.S. PATENT DOCUMENTS

| | | | |
|---|---|---|---|
| 6,697,276 B1 * | 2/2004 | Pereira et al. .............. 365/49.17 |
| 7,215,641 B1 * | 5/2007 | Bechtolsheim et al. ...... 370/235 |
| 2003/0223424 A1 * | 12/2003 | Anderson et al. ............. 370/392 |
| 2004/0264380 A1 * | 12/2004 | Kalkunte et al. .............. 370/238 |
| 2005/0190694 A1 * | 9/2005 | Ben-Nun et al. ............. 370/229 |
| 2006/0221930 A1 * | 10/2006 | Sweeney et al. ............. 370/351 |

* cited by examiner

*Primary Examiner* — Kwang B Yao
*Assistant Examiner* — Obaidul Huq
(74) *Attorney, Agent, or Firm* — JW Law Group; James M. Wu

(57) ABSTRACT

An apparatus and a method for load balancing across multiple routes using an indirection table and hash function during a process of packet classification are disclosed. A network device such as a router includes a memory, a hash component, and a result memory. The memory is referred to as an indirection random access memory ("RAM"), is capable of storing information regarding number of paths from source devices to destination devices. The memory, in one embodiment, provides a base index value and a range number indicating the number of paths associated with the base index value. The hash component generates a hash index in response to the base index value and the range number. Upon generation of hash index, the result memory identifies a classification result in response to the hash index.

22 Claims, 5 Drawing Sheets

US 8,169,915 B1

METHOD AND APPARATUS FOR NETWORK LOAD BALANCING USING INDIRECTION RAM DURING CLASSIFICATION

FIELD

The exemplary embodiment(s) of the present invention relates to communications network. More specifically, the exemplary embodiment(s) of the present invention relates to load balancing for a communications network.

BACKGROUND

A high-speed network environment typically includes network devices such as routers and switches that facilitate delivery of information packets from source devices to destination devices. Information pertaining to the transfer of packet(s) through the network is usually embedded within one or more packets. Each packet traveling through a network can typically be treated independently from other packets in a packet stream. For example, each router within a network processes incoming packets and determines where the packet(s) should be forwarded. In a high-speed computing network environment, the speed of packet processing or routing can be critical in determining the performance of overall network system.

To monitor network traffic, a virtual circuit or virtual connection is typically setup across a communications network such as a packet-switched network for managing packet flow. The virtual circuit, also known as virtual channel, provides packets delivery between various nodes within the virtual circuit. Packets pertaining to a packet flow typically travel through the virtual circuit to reach their destination(s). When network load for packet flows is unevenly distributed, the performance of network traffic may be degraded due to congested nodes. Congested nodes can happen when packets routing is concentrated to few nodes and can create bottlenecks for the virtual circuit of the network.

A conventional approach to balance network load is to implement load balancing technique to spread packets across multiple circuits, nodes, and/or paths between source and destination devices. One load balancing method is to route each request in turn to a different path or route based on a round-robin fashion. A drawback associated with the equal-weighted paths with round-robin fashion is that node congestion can still occur, and one or two congested nodes can slow down the entire network traffic.

SUMMARY

A network device and method for load balancing using an indirection memory during a process of packet classification are disclosed. A network device such as a router includes a memory, a hash component, and a result memory. The memory is an indirection random access memory ("RAM") and is capable of storing information regarding the number of paths from source devices to destination devices. The memory, in one embodiment, provides a base index value and a range number indicating the number of paths associated with the base index value. The hash component generates a hash index in response to the base index value and the range number. After generating hash index, the result memory identifies a classification result in response to the hash index.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
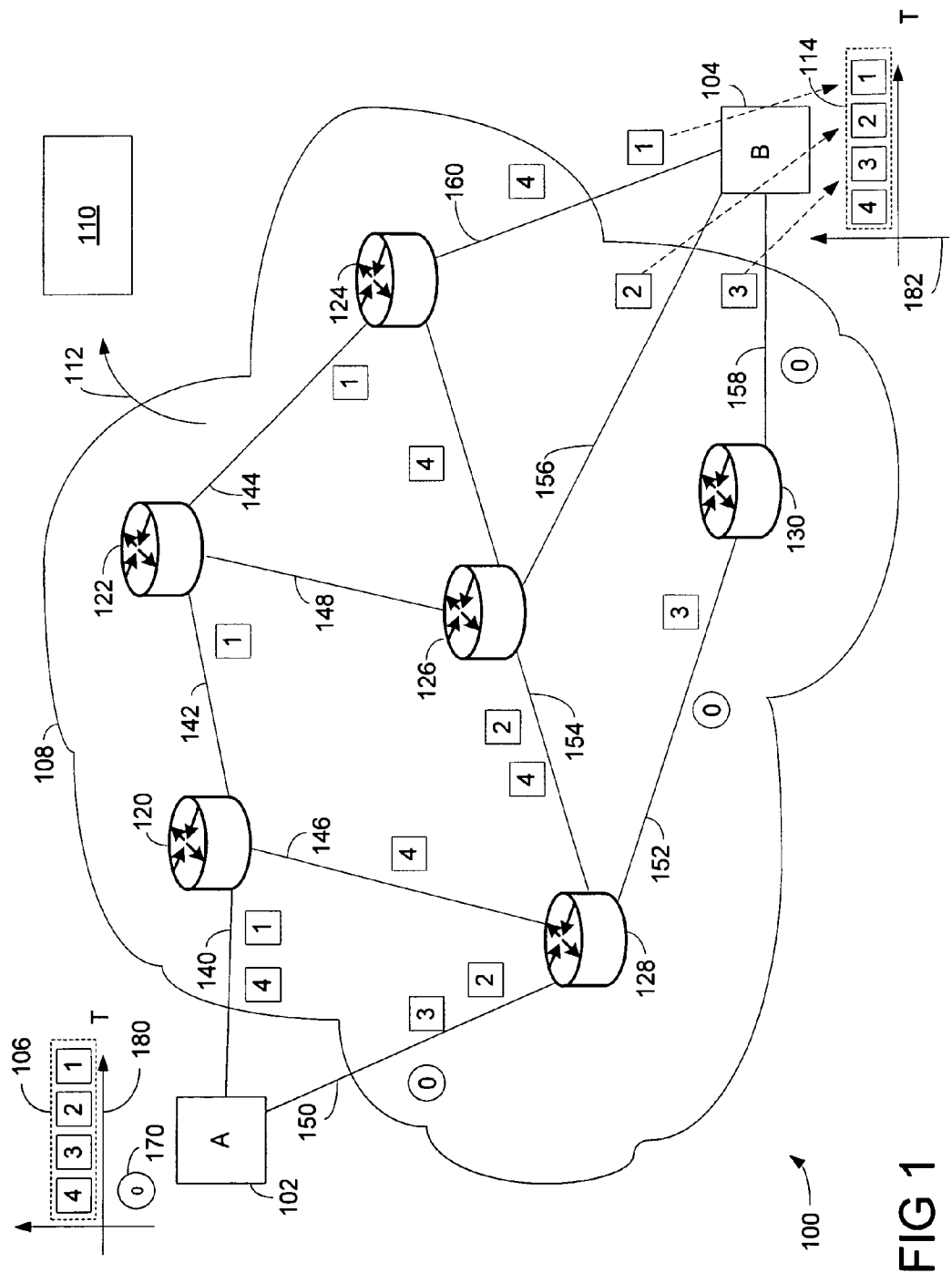
FIG. 1 is a diagram illustrating a network capable of providing load balancing using an indirection memory in accordance with one embodiment of the present invention.

Exemplary embodiment(s) of the present invention is described herein in the context of a method, device, and apparatus of load balancing across multiple routes within a network using an indirection memory during packet classification.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skilled in the art having the benefit of this disclosure.

In accordance with the embodiment(s) of the present invention, the components, process steps, and/or data structures described herein may be implemented using various types of operating systems, computing platforms, computer programs, and/or general purpose machines. In addition, those of ordinary skills in the art will recognize that devices of a less general purpose nature, such as hardwired devices, field programmable gate arrays (FPGAs), application specific integrated circuits (ASICs), or the like, may also be used without departing from the scope and spirit of the exemplary embodiment(s) of inventive concepts disclosed herein. Where a method including a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card and paper tape, and the like) and other known types of program memory.

A network device capable of providing load balancing across multiple routes using an indirection memory during a process of packet classification is disclosed. A network device such as a router or switch includes a memory, a hash component, and a result memory. The memory is referred to as an indirection random access memory ("RAM") and is capable of storing information regarding the number of paths from source devices to destination devices. The memory, in one embodiment, provides a base index value and a range number indicating the number of paths associated with the base index value. The hash component generates a hash index in response to the base index value and the range number. Upon generating hash index, the result memory identifies a classification result in response to the hash index.

FIG. 1 is a diagram 100 illustrating a network capable of providing load balancing using an indirection memory in accordance with one embodiment of the present invention. Diagram 100 includes a communications network 108, an indirection RAM 110, and a source node A 102, a destination node B 104. Source node A 102 and destination node B 104, for example, can be any type of network capable devices, such as optical converters, routers, switches, servers, printers, computers, and/or a combination of routers, servers, and computers. It should be noted that the underlying concept of the exemplary embodiment(s) of the present invention would not change if one or more blocks (or devices) were added to or removed from diagram 100.

Communications network 108, in one embodiment, is a packet-switching network, which includes various nodes 120-130. A communication network includes various building blocks or nodes, such as routers, bridges, hubs, switches, repeaters, optical converters, servers, printers, computers, and the like. Network 108 also includes links or connections 140-160, which are used for connecting nodes 120-130. Although network 108 has six (6) nodes 120-130, it could have hundreds or thousands nodes. Network 108 can be a personal area network (PAN), local area network (LAN), metropolitan area network (MAN), wide area network (WAN), world wide web (WWW), or a combination of PAN, LAN, MAN, WAN, and WWW. Source node A 102 and destination node B 104 are coupled to network 108, and they, in one embodiment, are a part of network 108.

Source node A 102 or node A is coupled to network 108 via links 140 and 150 while destination node B 104 or node B is coupled to network 108 via links 156-160. Node A and node B, in one embodiment, can be routers, switches, computers, hubs, and so forth.

Referring back to FIG. 1, source node A is configured to send a packet stream 106, which, for example, includes four (4) packets to destination node B in a sequence of packet 1, packet 2, packet 3, and packet 4 via network 108. Network 108, for example, can forward packets through different routes or paths from node A to node B, and if the packets arrive at node B out of sequence, network 108 is capable of reassembling a packet stream 114 with correct order at node B.

In one exemplary operation, packet steam 106 is sent from source node A to destination node B via network 108. Packet 1 of packet stream 106 selects nodes 120-124 to travel from source node A to destination node B, while packet 2 picks nodes 128 and 126 to proceed from source node A to destination node B. While packet 3 moves from source node A to destination node B via nodes 128 and 130, packet 4 hops from nodes 120, 128, and 126 to destination node B. Although packets 1-4 may not arrive at destination node B with the same order of packets before they leave source node A, destination node B is capable of reassembling packets 1-4 into packet stream 114 with correct order.

A packet stream containing a correct packet order can be critical to data integrity especially for transmitting audio and/or video information. For example, source node A may send a packet stream 106 in a sequence from packet 1 through packet 4 as indicated by a time axis 180 to its destination via network 108. Depending on the network traffic, packets 1 through 4 may arrive at destination node B in a different sequence because different packet in the packet stream may take different path to reach its destination. As such, destination node B is configured to reassemble packet order from packets 1 through 4 with respect to time indicated by a time axis 182. It should be noted that the packet stream 114 may again be forwarded to a next destination device(s).

To provide load balancing over network 108, indirection RAM 110, in one embodiment, is used to store possible paths or routes from a source node to a destination node. In other words, indirection RAM 110 is used to provide alternative path(s) for balancing the load. For example, information stored in indirection RAM 110 can be used to assist in avoiding node congestions. Node congestion slows down network communication and creates traffic congestion. The network traffic congestion occurs when multiple sources send packets to a node for routing, which becomes a bottleneck of a network traffic. In one embodiment, network software controls and updates data stored in indirection RAM 110.

A function of a network 108, for example, is to receive a packet or a packet stream 106 from source node or device 102 and route or redirect the received packet(s) to destination node or device 104 via achievable and/or efficient paths. In one example, a testing packet 170 is used for broadcasting to network 108 to obtain routing information. As illustrated in FIG. 1, testing packet 170 travels from source device A to destination device B via routers or nodes 128 and 130. Routing information relating to nodes or devices 120-130, in one embodiment, includes information relating to various node connections and node congestions. Node congestion, for example, can happen when multiple packets are routed through the same router in a network.

To improve network traffic, indirection RAM 110, in one embodiment, is used to provide alternative routes or paths to facilitate a packet traveling through a network via a less congested path. Indirection RAM 110 includes a base index value and a range number, wherein the base index is a path and the range number indicates alternative paths. For example, packet 1 of packet stream 106 can be routed from source node 102 to destination node 104 via nodes 128 and 130. Alternatively, packet 1 can also be routed through nodes 120, 122, and 124 before it reaches destination node 104. Depending on the network traffic, indirection RAM 110 is capable of facilitating to identify a less congested path for a packet or packets to reach its or their destinations. Indirection RAM 110 provides the flexibility to perform link weighted packet-routing mechanism by having multiple indirection entries point to the same destination.

Figure 2:
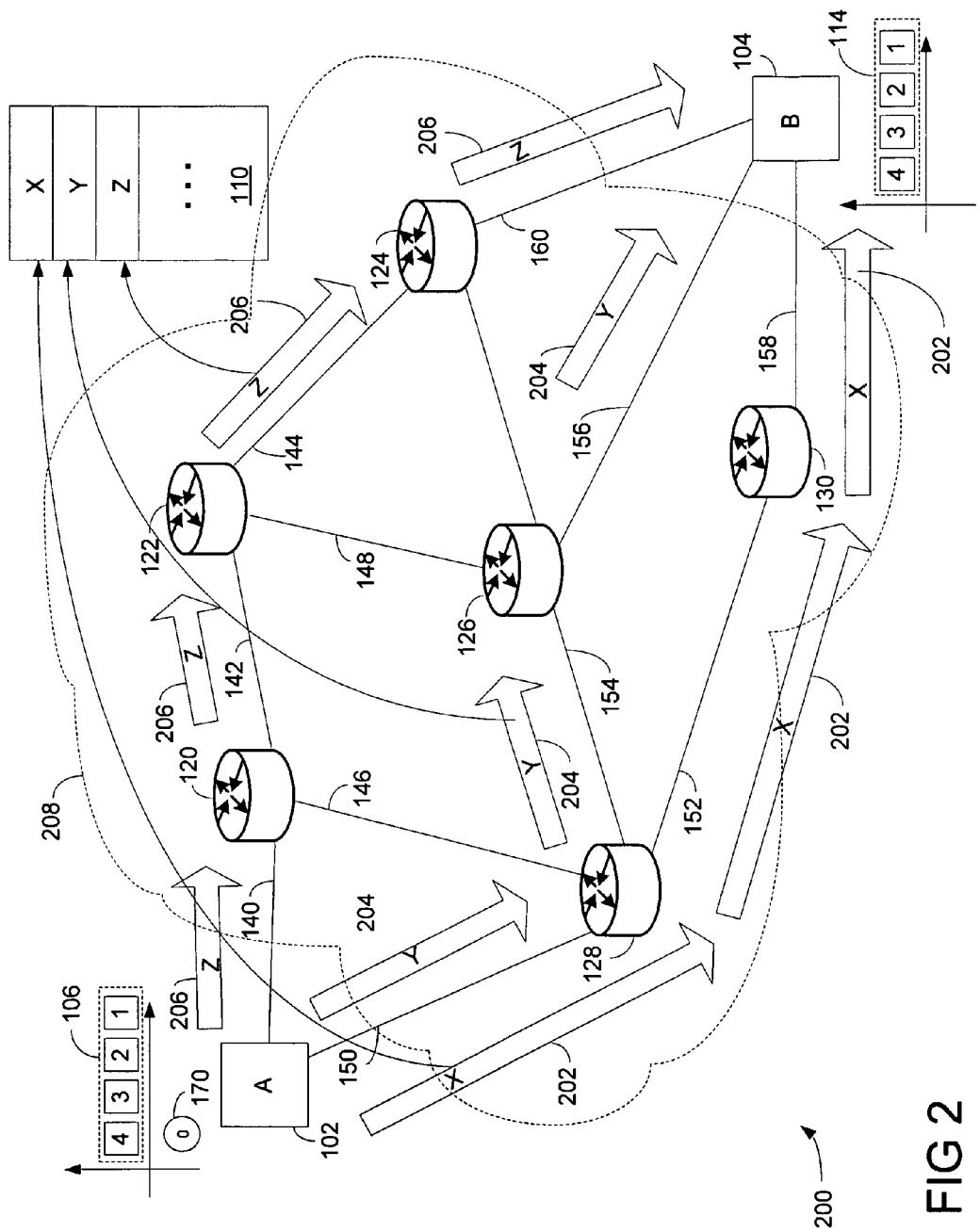
FIG. 2 is a diagram illustrating a network capable of providing load balancing using an indirection RAM during classification in accordance with one embodiment of the present invention.

FIG. 2 is a diagram 200 illustrating a network capable of providing load balancing using an indirection RAM 110 during packet classification in accordance with one embodiment of the present invention. Diagram 200 includes a communications network 208, an indirection RAM 110, a source node 102, and a destination node 104. Indirection RAM 110, in one embodiment, stores information relating to possible alternative paths or routes between source node 102 and destination node 104. It should be noted that the underlying concept of the exemplary embodiment(s) of the present invention would not change if one or more blocks (or devices) were added to or removed from diagram 200.

Network 208 illustrates three possible routes or paths, which are denoted as route X, route Y, and route Z between source node 102 and destination node 104. For example, route X includes node 128, node 130, link 150, link 152, and link 158. A packet can travel from source node 102 to destination node 104 via route X. Route Y, on the other hand, includes node 128, node 126, link 150, link 154, and link 156. Instead of traveling through route X, a packet can also travel from source node 102 to destination node 104 via route Y. In addition, route Z includes node 120, node 122, node 124, link 140, link 142, link 144, and link 160, wherein route Z is an alternative route for a packet to travel from node 102 to node 104. It should be noted that additional paths or routes are possible. For example, a path including node 120, node 122, node 126, link 140, link 142, link 148, and link 156 can provide another alternative route from node 102 to node 104. As such, depending on traffic condition, a packet can either select route X, route Y, or route Z to travel from source node 102 to destination node 104.

Indirection RAM 110, in one embodiment, is used together with a hashing mechanism to select a less congested path. For example, if nodes 124 and 126 are busy, a router with indirection RAM 110 is capable of selecting route X to transfer a packet(s). Indirection RAM 110, in one aspect, stores information relating to possible routes or paths such as routes X, Y, and/or Z. The data stored in indirection RAM 110 is maintained and updated by device software. It should be noted that indirection RAM 110 can be any types of memory device as long as it performs substantially the same functions as indirection RAM 110. It should be further noted that coupling a hashing mechanism with an indirection RAM during a classifying process of a packet provides flexibility of link weighted by having multiple indirection entries point to the same result (or same destination).

Although routes X, Y, or Z can reach the same destination such as node 104, they are weighted based on network congestion between routers 120-130. Indirection RAM 110 is configured to store the information regarding the number of routes 202-206 from a source to destination. By programming and storing information relating to routes in Indirection RAM 110 pointing the same destination, indirection RAM provides information relating to load balancing for a link weighted packet-switching network. It should be noted that the underlying concept of the embodiment of the present invention would not change if additional nodes were added to network 208.

Figure 3:
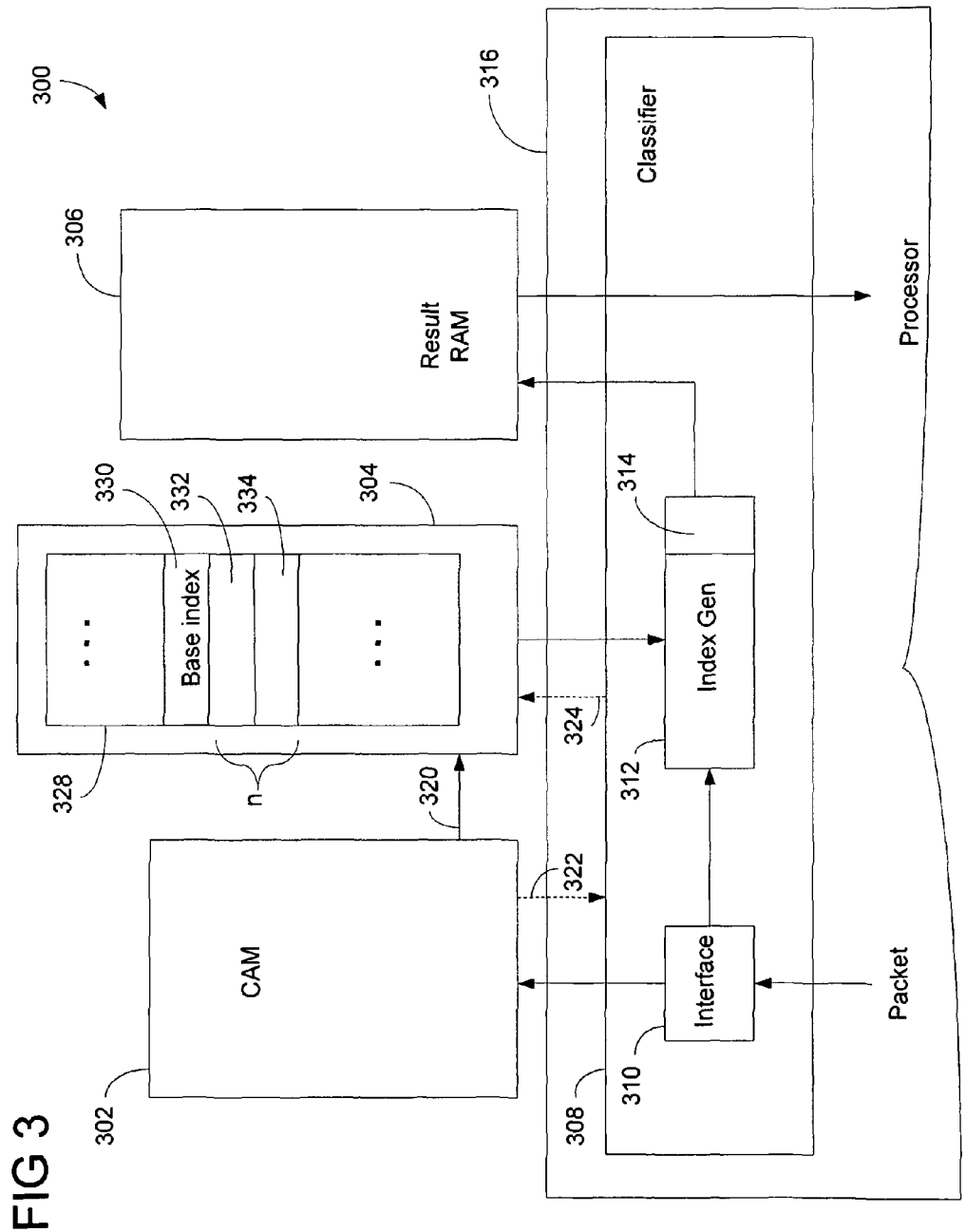
FIG. 3 is a block diagram illustrating a router capable of providing load balancing in accordance with one embodiment of the present invention.

FIG. 3 is a block diagram illustrating a router 300 capable of providing load balancing in accordance with one embodiment of the present invention. Router 300 includes a content-addressable memory ("CAM") 302, an indirection RAM 304, a result RAM 306, and a routing chip 316. In an alternative embodiment, indirection Ram 304 is integrated into routing chip 316. It should be noted that the underlying concept of the exemplary embodiment(s) of the present invention would not change if one or more blocks (or devices) were added to or removed from router 300.

Router 300 can be a network switch, a network converter, a network hub, and/or a packet processing device. A function of router 300 is to route a high-speed network data packet to an appropriate destination within a predefined time period, also known as line rate. Line rate is a speed of data stream or packets arriving at an input port of a router. To process packets at a line rate, router 300 is required to route packets at the same or substantially the same speed as the packets arrive. To route and/or process each packet correctly and efficiently, router 300 performs various packet processing procedures such as packet classification, packet traffic management, packet editing, packet scheduling, packet switching, and the like. In one embodiment, router 300 is also capable of performing data conversions, such as generating electrical signals in accordance with optical signals.

A packet includes a head portion and a data portion. The head portion, also known as header, refers to additional information located at the beginning of a packet, which includes information relating to how the packet should be forwarded. For example, the header may include source address, destination address, payload type, quality of service ("QoS"), and payload length indicator. The data portion, also known as payload, refers to data block, which may be audio information, video information, data, or a combination of audio, video and data. The length of the payload is indicated by the payload length indicator of the header. Router 300, in one embodiment, is configured to forward a packet(s) in accordance with the information contained in the header.

Packet classification is a process to categorize a packet or packets according to a set of predefined rules including how the packet should be forwarded. Traffic management, on the other hand, also determines whether the packet should be forwarded or dropped. For example, if a blocking parameter of a firewall matches with the parameter specified in the packet, the packet may be blocked. Packets may also be modified or edited. For example, if the bandwidth of a packet exceeds the bandwidth of an output port, the packet may be modified before it can be transmitted. Packet scheduling identifies when the packet should be sent and packet shaping prevents packets bursting phenomenon. It should be noted that the packet modification, packet scheduling, packet shaping, et cetera, can be obtained based on packet classification.

To process packets at a line rate, routing chip 316 includes a classifier 308, which further include a key generator, an index generator 312, and an interface 310. Classifier 308, in one embodiment, is coupled to CAM 302 via interface 310, indirection RAM 304 via index generator 312, and result RAM 306. The key generator, which is not shown in FIG. 3, is configured to provide a lookup key in response to information stored in the header. The lookup key is subsequently used to access a classification lookup table located in CAM 302. The classification lookup table includes various indexes associated with lookup keys. The lookup key is subsequently used to compare with the content of each entry of classification lookup table until a match is found. Upon finding a match, CAM 302 identifies and fetches an index, which is sent back to classifier 308 via connection 322. Alternatively, the index is sent directly to indirection RAM 304 via connection 320.

Indirection RAM 304, which can be any types of storage device capable of storing information, is organized in a database or a table configuration for storing data relating to possible alternative routes or paths between various nodes. Indirection RAM 304, for example, stores a base index 330 and a range number n, wherein base index 330 indicates a path between two nodes and a range number n indicates possible alternative routes between two nodes. Alternatively, indirection RAM 304 stores multiple base indexes between a source node and a destination node, wherein multiple base indexes indicate one or more alternative routes between the source node and destination node. Base index and a range number n stored in indirection RAM 304 are identified and fetched in accordance with the index from CAM 302.

Index generator 312, in one embodiment, having a hashing component 314, is capable of providing alternative paths and identifying a less congested path among available routes. Upon receipt of a base index and a range number n from indirection RAM 304, index generator 312 calculates a hash index, which equals to the base index plus hashed range number n. The mathematic expression for the index equation is, $$\text{Hash index} = \text{base index} + \text{hash}(n)$$

For example, index generator 312 uses a hashing algorithm performed by a circuit such as component 314 to identify a preferred path or a less congested network route for a packet to travel from a source device to a destination device. An egress path calculated by the index equation may be classified and obtained from result RAM 306. Result RAM 306 provides a classification result, which selects an output port of router 300 in accordance with a less congested route.

During a process of classification, a lookup key is generated in accordance with a packet header, and CAM 302 is subsequently accessed using the lookup key. Upon returning an index from a CAM lookup, the index is used to access indirection RAM 304. In one embodiment, the contents stored in indirection RAM 304 include a base index pointing to a location of result RAM 306 as well as a range number or number "n" indicating number of alternative links or paths to spread load across the network. A result index or hash index for accessing result RAM 306 can be, as described above, calculated as hash index=base_index+(hash n), where hash value is derived from the packet header. The content of result RAM 306 pointed by the result or hash index is used to classify the packet. The packet is subsequently sent to the destination in response to the result pointed by the hash index.

It should be noted that having multiple entries in indirection RAM 304 pointing to the same destination with multiple paths or links, weighted links or path for load balancing can be implemented. An advantage of load balancing is to enhance the performance of a communications network as well as improve network bandwidth.

Figure 4:
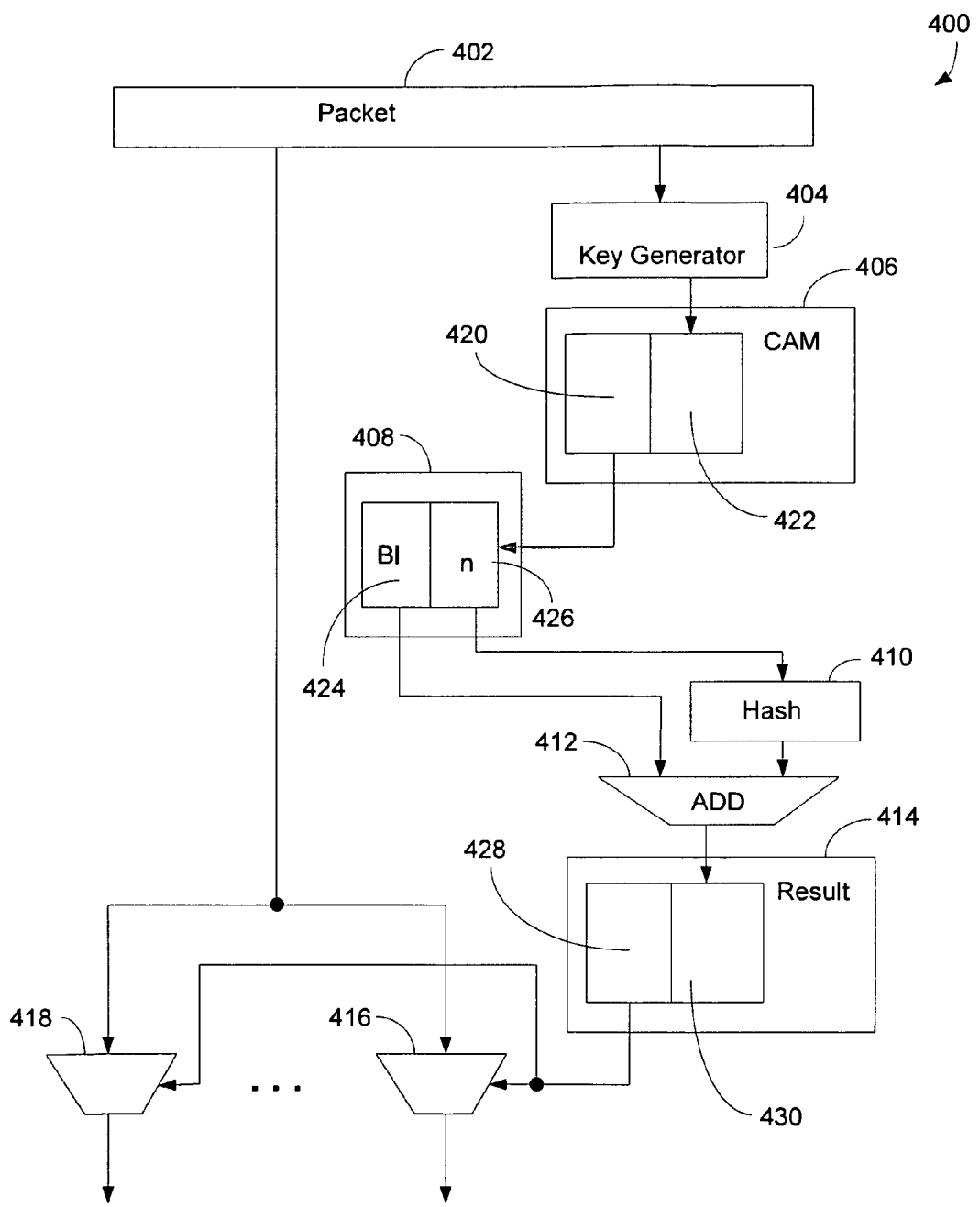
FIG. 4 is a logic block diagram illustrating a router using an indirection RAM for load balancing in accordance with one embodiment of the present invention.

FIG. 4 is a logic block diagram illustrating a router 400 using an indirection RAM for load balancing in accordance with one embodiment of the present invention. Router 400 includes a packet 402, a key generator 404, a CAM 406, an indirection memory 408, and a result memory 414. Router 400, in one embodiment, includes multiple output ports 416-418, wherein a function of router 400 is to determine which output port should be selected to forward packet 402. It should be noted that the underlying concept of the exemplary embodiment(s) of the present invention would not change if one or more blocks were added to or removed from router 400.

FIG. 4 shows a logic data flow illustrating a load balancing process for routing packet 402 from an input port to one of the output ports using an indirection RAM or memory 408. Upon receipt of packet 402, key generator 404 generates a key value based on the header of packet 402. The key value is subsequently used to access CAM 406, wherein the key value is compared with keys 422 stored in CAM 406. After the key value is matched with a key in CAM 406, CAM 406 returns an index 420 associated with key 422. A base index 424 is subsequently fetched from indirection RAM 408 in response to the index. After identifying base index 424, a range number "n" 426 is determined. Hash component 410 provides a hash result to adder 412 after hashing the range number n. Adder 412 identifies a result index by adding the base index with the hash result. Once the result index matches with address value 430 in result memory 414, result memory 414 returns a result 428, which is a load balancing result. The result is used to determine which output ports 416-418 should be used to forward packet 402.

The exemplary embodiment of the present invention includes various processing steps, which will be described below. The steps of the embodiment may be used in machine or computer executable instructions. The instructions can be used to cause a general purpose or special purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components. While embodiments of the present invention will be described with reference to the communications network, the method and apparatus described herein are equally applicable to other network infrastructures or other data communications environments.

Figure 5:
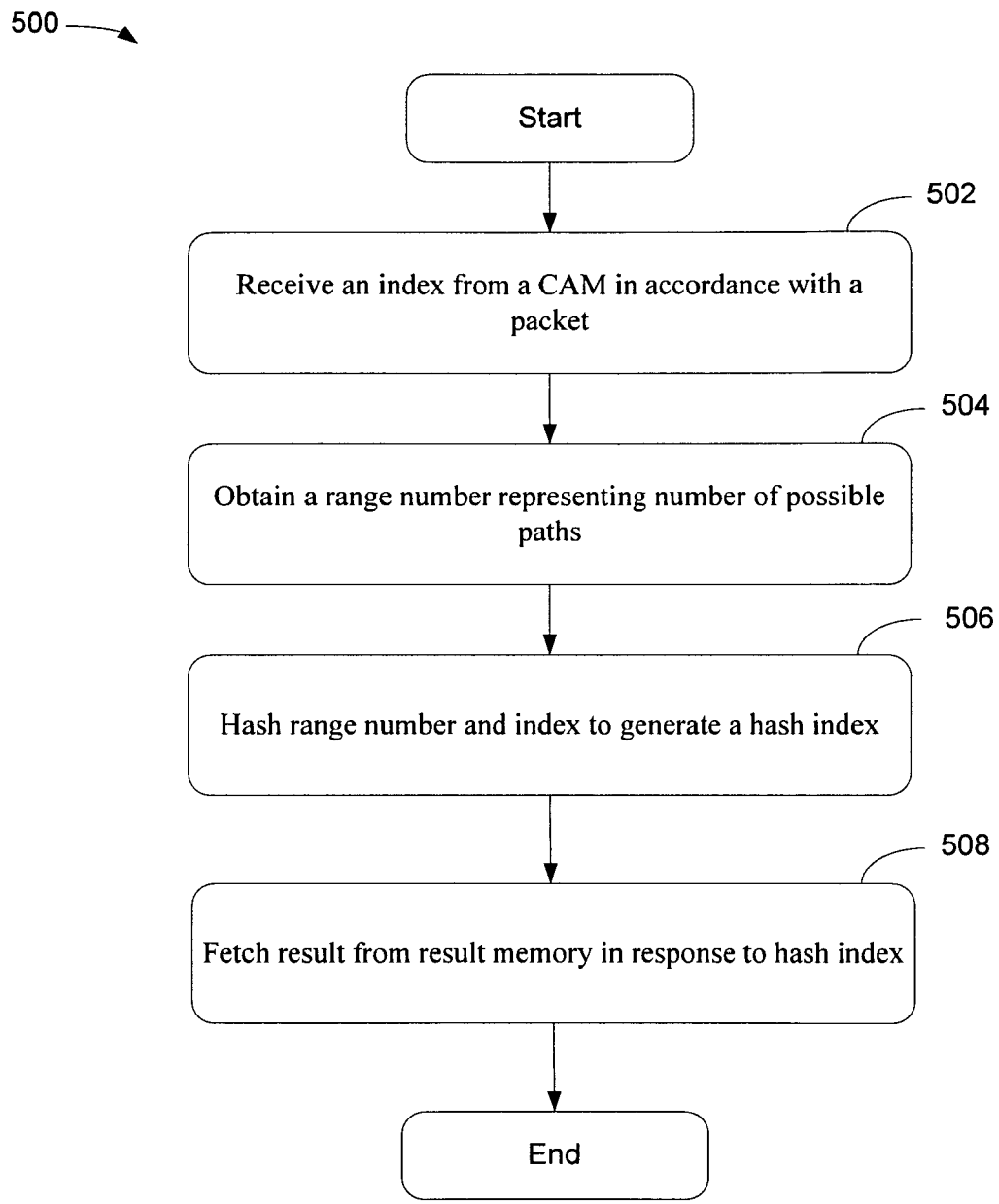
FIG. 5 is a flowchart illustrating a process for network load balancing in accordance with one embodiment of the present invention.

FIG. 5 is a flowchart 500 illustrating a process for network load balancing in accordance with one embodiment of the present invention. At block 502, a process receives an index from a CAM in accordance with a packet. In one embodiment, upon receipt of the packet from an input port, the process generates a key in response to the packet. The key is, subsequently, forwarded to the CAM for accessing a lookup table. After block 502, the process proceeds to the next block.

At block 504, the process obtains a range number representing the number of possible paths between the source device and destination device. In one embodiment, the process fetches the range number from a memory in accordance with the index. Upon accessing an indirection RAM in accordance with the index, the process fetches the range number from a storage location in the indirection RAM. It should be noted that the process uses the index to address the storage location in the indirection RAM. After block 504, the process proceeds to the next block.

At block 506, the process is capable of generating a hash index in response to the range number and the index. Upon hashing the range number to generate a hashed number, the process adds the hashed number with the index to generate a hash index. It should be noted that the hash index indicates a less congested path for a packet to travel from a source device to a destination device. After block 506, the process proceeds to the next block.

At block 508, the process fetches a result from a result memory in response to the hash index. In one embodiment, the process is capable of selecting one of the results in a result RAM in response to the hash index. The process subsequently classifies a packet in accordance with the result. After block 508, the process ends.

While particular embodiments of the present invention have been shown and described, it will be obvious to those skilled in the art that, based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A network device comprising:
   a content-addressable memory ("CAM") configured to provide an index in accordance with information stored in a header of a packet;
   a memory coupled to the CAM and configured to provide information regarding number of paths from source devices to destination devices in accordance with the index, wherein the memory provides a base index value and a range number, wherein the range number indicates number of alternative paths associated with the base index value;
   a hash component coupled to the memory and configured to generate a hash index in response to the base index value and the range number, wherein the hash index indicates a less congested path to route the packet; and
   a result memory coupled to the hash component and capable of identifying a classification result in response to the hash index.

2. The device of claim 1, further comprising:
   a key generator coupled to the memory and configured to generate a key in response to a packet.

3. The device of claim 1, wherein the memory is an indirection random access memory ("RAM").

4. The device of claim 3, wherein the indirection RAM is an on-chip storage memory.

5. The device of claim 1, wherein the base index value is one of the number of paths for a packet to travel from a source device to a destination device.

6. The device of claim 1, wherein the range number is an offset value indicating physical storage locations in the memory associated from the base index value for storing number of possible paths for a packet to travel from a source device to a destination device.

7. The device of claim 6, wherein the base index value is a reference address for the range number.

8. The device of claim 1, wherein the hash component is capable of generating the less congested path for a packet to travel from the source device to the destination device utilizing addition of the base index value with hashed value of the range number.

9. A method for network load balancing, comprising:
   receiving an index from a content-addressable memory ("CAM") in accordance with a packet;
   obtaining a base index and a range number representing number of possible paths between a source device and a destination device from a memory in response to the index;
   identifying an alternative path addressed by the range number and the base index in the memory;
   generating a hash index in response to the range number and the base index; and
   fetching a result indicating a less congested path for packet routing from a result memory in response to the hash index.

10. The method of claim 9, further comprising classifying a packet in accordance with the result.

11. The method of claim 10, wherein fetching a result indicating a less congested path for packet routing from a result memory in response to the hash index further include selecting one of a plurality of results in a result random access memory ("RAM") in response to the hash index.

12. The method of claim 9, wherein receiving an index from a content-addressable memory ("CAM") in accordance with a packet further includes, receiving the packet from a port;
   generating a key in response to the packet; and
   forwarding the key to the CAM.

13. The method of claim 9, wherein obtaining a base index and a range number representing number of possible paths further includes, accessing an indirection random access memory ("RAM") in accordance with the index; and
   fetching the range number from a storage location in the indirection RAM.

14. The method of claim 13, wherein fetching the range number further includes utilizing the index to address the storage location for storing the range number in the indirection RAM.

15. The method of claim 9, wherein generating a hash index in response to the range number and the base index further includes,
   hashing the range number to generate a hashed number; and
   adding the hashed number to the base index;
   wherein the hash index indicates a path capable of transmitting the packet in a line rate to travel from the source device to the destination device.

16. An apparatus having a content-addressable memory ("CAM"), a memory, and a routing chip, for network load balancing, comprising:
   means for receiving an index from the CAM in accordance with a packet;
   means for obtaining a base index and a range number representing number of possible paths between a source device and a destination device from the memory in response to the index;
   means for identifying an alternative path addressed by the range number and the base index in the memory;
   means for generating a hash index in response to the range number and the base index; and
   means for fetching a result indicating a less congested path for packet routing from a result memory in response to the hash index.

17. The apparatus of claim 16, further comprising means for classifying a packet in accordance with the result.

18. The apparatus of claim 17, wherein means for fetching a result indicating a less congested path for packet routing from a result memory in response to the hash index further include means for selecting one of a plurality of results in a result random access memory ("RAM") in response to the hash index.

19. The apparatus of claim 16, wherein means for receiving an index from the CAM in accordance with a packet further includes,
   means for receiving the packet from a port;
   means for generating a key in response to the packet; and
   means for forwarding the key to the CAM.

20. The apparatus of claim 16, wherein means for obtaining a base index and a range number representing number of possible paths further includes,
   means for accessing an indirection random access memory ("RAM") in accordance with the index; and
   means for fetching the range number from a storage location in the indirection RAM.

21. The apparatus of claim 20, wherein means for fetching the range number further includes means for utilizing the index to address the storage location for storing the range number in the indirection RAM.

22. The apparatus of claim 16, wherein means for generating a hash index in response to the range number and the base index further includes,
   means for hashing the range number to generate a hashed number; and
   means for adding the hashed number to the base index;
   wherein the hash index indicates a path capable of transmitting the packet in a line rate to travel from the source device to the destination device.

* * * * *